(12) United States Patent
Takenaka

(10) Patent No.: US 11,241,926 B2
(45) Date of Patent: Feb. 8, 2022

(54) SUSPENSION APPARATUS AND VEHICLE

(71) Applicant: TOYOTA JIDOSHA KABUSHIKI KAISHA, Toyota (JP)

(72) Inventor: Hidehiro Takenaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/656,030

(22) Filed: Oct. 17, 2019

(65) Prior Publication Data

US 2020/0139775 A1 May 7, 2020

(30) Foreign Application Priority Data

Nov. 5, 2018 (JP) .............................. JP2018-208218

(51) Int. Cl.
*B60G 3/20* (2006.01)
*B60K 7/00* (2006.01)

(52) U.S. Cl.
CPC . *B60G 3/20* (2013.01); *B60K 7/00* (2013.01)

(58) Field of Classification Search
CPC .............. B60K 7/00; B60K 2007/0038; B60K 2007/0061; B60K 2007/0007; B60G 2204/182
See application file for complete search history.

(56) References Cited

U.S. PATENT DOCUMENTS

| 10,377,224 B2 * | 8/2019 | Tamura | B60K 7/0007 |
| 10,889,178 B2 * | 1/2021 | Tamura | B60G 7/00 |
| 10,906,372 B2 * | 2/2021 | Shibuya | B60G 3/06 |
| 2005/0275183 A1 * | 12/2005 | Amano | B60G 3/20 280/124.128 |
| 2007/0102210 A1 | 5/2007 | Oshidari | |
| 2007/0209852 A1 * | 9/2007 | Kamiya | B60G 3/20 180/65.51 |

(Continued)

FOREIGN PATENT DOCUMENTS

| DE | 102011011011 A1 * | 8/2011 | ........... B60K 7/0007 |
| JP | 2007-131160 A | 5/2007 | |
| WO | WO-2016181795 A1 * | 11/2016 | ............... B60K 7/00 |

OTHER PUBLICATIONS

Tamura et al., Suspension Structure for In-Wheel Motor Drive Device, Nov. 17, 2016, EPO, WO 2016/181795 A1, Machine Translation of Description (Year: 2016).*

(Continued)

*Primary Examiner* — James A English
(74) *Attorney, Agent, or Firm* — Sughrue Mion, PLLC

(57) ABSTRACT

A suspension apparatus supports a wheel of a vehicle which includes an in-wheel motor held by a carrier. A motor rotation axis of an output shaft of the in-wheel motor is located at a position identical in an up and down direction to or above a wheel rotation axis of the wheel. The suspension apparatus includes suspension arms coupled to the carrier holding the in-wheel motor. The suspension arms include first suspension arms each extending substantially in a widthwise direction of the vehicle. Each of the first suspension arms is coupled to a corresponding one of portions of the carrier which are located below the motor rotation axis. A first upper arm of the first suspension arms is coupled to a portion of the carrier which is located on an inner side of the in-wheel motor in the vehicle.

7 Claims, 3 Drawing Sheets

(56) References Cited

U.S. PATENT DOCUMENTS

| | | | | |
|---|---|---|---|---|
| 2014/0015382 A1* | 1/2014 | Kim | ........................ | H02K 7/14 |
| | | | | 310/67 R |
| 2014/0353937 A1* | 12/2014 | Girelli Consolaro | .. | B60G 11/22 |
| | | | | 280/124.128 |
| 2016/0221432 A1* | 8/2016 | Tamura | .................... | B60G 3/20 |
| 2020/0391547 A1* | 12/2020 | Shin | ................... | B60B 27/0052 |

OTHER PUBLICATIONS

Philipp Ebner, Housing for Wheel Hub Drive For Motor Vehicles, Has Motor, Particularly Electric Motor, and Two Integrally Formed Fastening Segments for Attachment Components of Suspension, Aug. 18, 2011, EPO, DE 10 2011 011 011 A1, Machine Translation of Description (Year: 2011).*

Joshua C. Johnson, et al., "A compact rear chassis for the 2018 Honda Odyssey—merits and challenges, and innovations", Springer Fachmedien Wiesbaden GmbH, 8th International Munich Chassis Syposium, 2017, pp. 105-130.

\* cited by examiner

SUSPENSION APPARATUS AND VEHICLE

CROSS REFERENCE TO RELATED APPLICATION

The present application claims priority from Japanese Patent Application No. 2018-208218, which was filed on Nov. 5, 2018, the disclosure of which is herein incorporated by reference in its entirety.

BACKGROUND

The following disclosure relates to a suspension apparatus configured to support a wheel including an in-wheel motor and to a vehicle including the suspension apparatus.

Patent Document 1 (Japanese Patent Application Publication No. 2007-131160) discloses a suspension apparatus configured to support a wheel including an in-wheel motor. The present suspension apparatus is of a strut type and configured such that a trailing arm that is a suspension arm extending in a front and rear direction of a vehicle is coupled to a lower end portion of a carrier holding the in-wheel motor.

SUMMARY

Accordingly, an aspect of the disclosure relates to improvement of a suspension apparatus configured to support a wheel including an in-wheel motor, and, for example, to lowering of the bottom of a body of the vehicle.

In one aspect of the disclosure, a suspension apparatus is configured to support a wheel including an in-wheel motor. The suspension apparatus includes a plurality of first suspension arms coupled to a carrier holding the in-wheel motor and extending substantially in a widthwise direction of the vehicle. Each of the plurality of first suspension arms is coupled to a corresponding one of portions of the carrier which are located below a rotation axis of the in-wheel motor. This configuration can lower the bottom of a body of the vehicle. Also, one of the first suspension arms, namely, a first upper arm, is coupled to a portion of the carrier which is located on an inner side of the in-wheel motor in the vehicle, thereby well securing a space for the in-wheel motor in the wheel. In other words, the first upper arm is shorter than another of the first suspension arms, namely, a second upper arm, and coupled to the portion of the carrier which is located on an inner side of the in-wheel motor in the vehicle, so as to satisfy required toe characteristics and so on and well secure the space for the in-wheel motor in the wheel, e.g., in a region surrounded by a rim.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described a vehicle including a suspension apparatus according to one embodiment by reference to the drawings.

Figure 1:
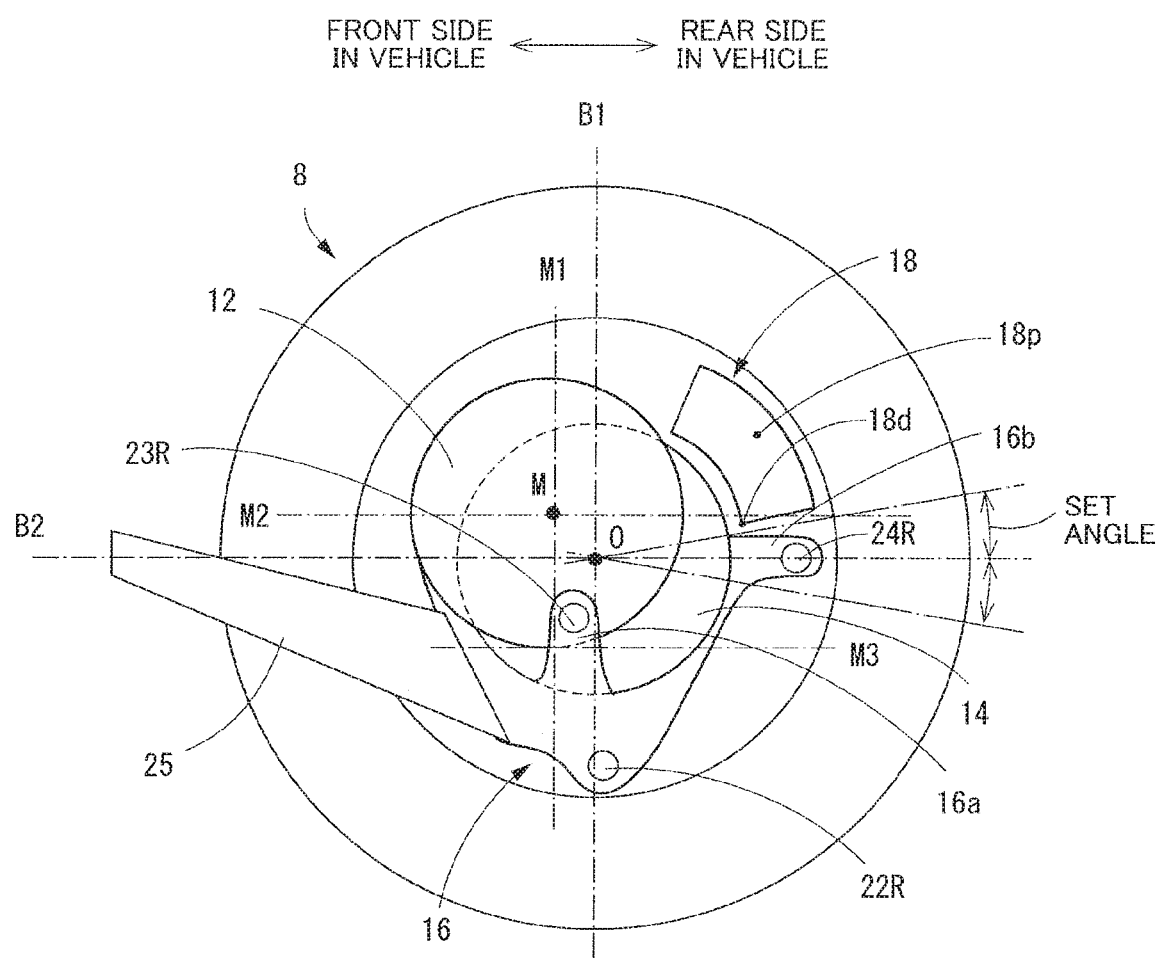
FIG. 1 is a side view of a vehicle including a suspension apparatus according to one embodiment.
Figure 2:
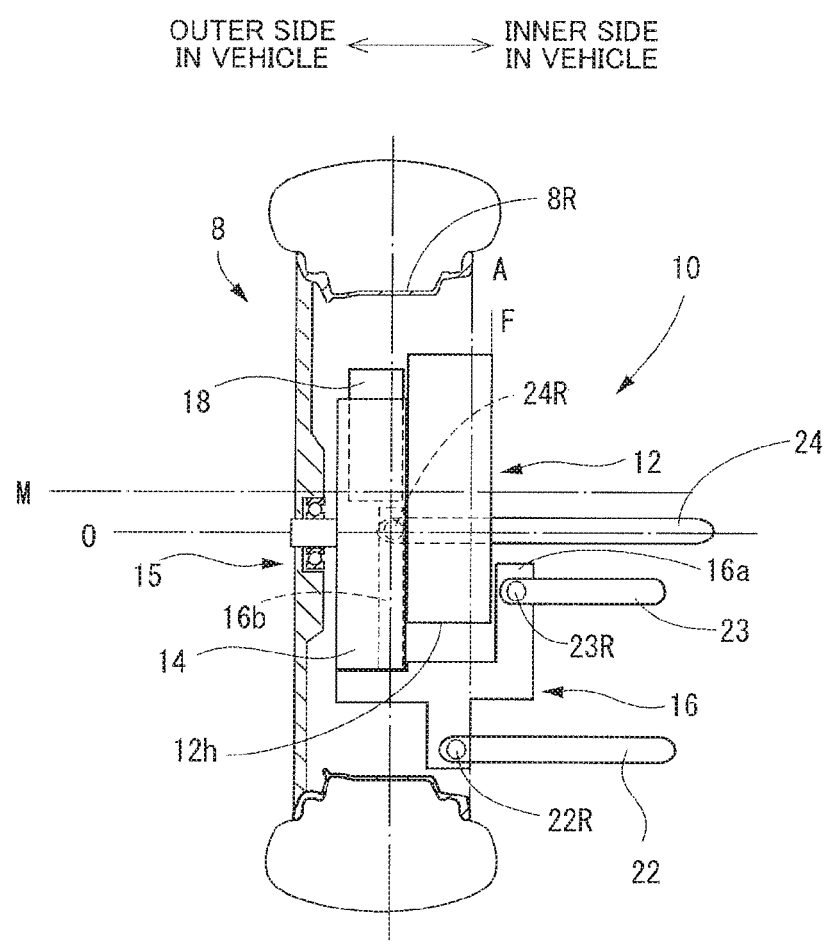
FIG. 2 is a front elevational view of the vehicle.
Figure 3:
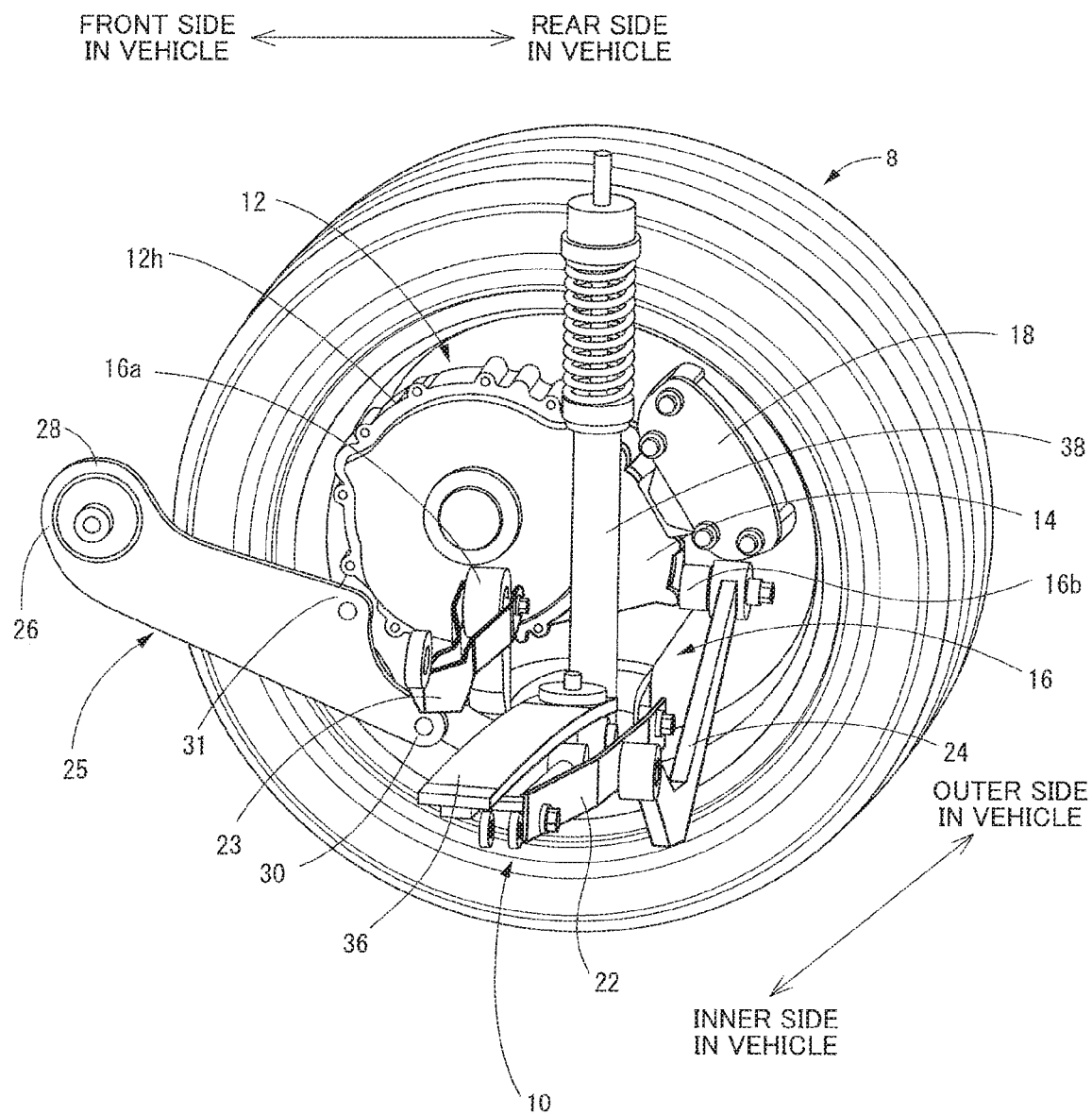
FIG. 3 is a perspective view of the vehicle.

As illustrated in FIGS. 1-3, the present vehicle includes drive wheels 8 and a suspension apparatus 10 configured to support a corresponding one of the drive wheels 8. In the present embodiment, the drive wheel 8 is a rear wheel. It is noted that the drive wheel 8 will be hereinafter referred to as "wheel 8". An in-wheel motor 12 for driving the wheel 8 is provided in the wheel 8. Rotation of the in-wheel motor 12 is decelerated by a speed reducer 14 and transmitted to the wheel 8. In the present embodiment, the speed reducer 14 is located on an outer side of the in-wheel motor 12 in the vehicle, and an output shaft of the speed reducer 14 is coupled to a disc portion of the wheel 8 via an axle bearing 15.

Thus, in the present embodiment, a speed-reducer rotation axis O that is a rotation axis of the output shaft of the speed reducer 14 coincides with a wheel rotation axis O that is a rotation axis of the wheel 8, and a motor rotation axis M that is a rotation axis of an output shaft of the in-wheel motor 12 is located above and on a front side of the wheel rotation axis (the speed-reducer rotation axis) O in the vehicle. In other words, the motor rotation axis M is located on a front side of a line B1 orthogonal to the wheel rotation axis O and extending in the up and down direction (which will be hereinafter referred to as "wheel up-and-down-directional line" or "speed-reducer up-and-down-directional line") and located above a line B2 orthogonal to the wheel rotation axis O and extending in the front and rear direction (which will be hereinafter referred to as "wheel front-and-rear-directional line" or "speed-reducer front-and-rear-directional line"). The in-wheel motor 12 and the speed reducer 14 are held by a carrier 16.

As illustrated in FIGS. 2 and 3, the carrier 16 holds the in-wheel motor 12 by holding the speed reducer 14. The carrier 16 is spaced apart from a motor casing 12h for the in-wheel motor 12. Thus, a force applied to the carrier 16 is applied to components including the speed reducer 14 and the axle bearing 15 and is not applied to the in-wheel motor 12 directly.

A caliper 18 of the brake configured to reduce rotation of the wheel 8 is provided in the wheel 8 above and on a rear side of the wheel rotation axis O in the vehicle, in other words, above the wheel front-and-rear-directional line B2 and on a rear side of the wheel up-and-down-directional line B1 in the vehicle. That is, a center point 18p of the caliper 18 in its circumferential direction is located above the wheel front-and-rear-directional line B2.

The suspension apparatus 10 is a multilink suspension apparatus that includes: first suspension arms 22, 23, 24 each extending substantially in the widthwise direction of the vehicle; and a second suspension arm 25 extending substantially in the front and rear direction of the vehicle. In the present embodiment, one end portion of each of the first suspension arms 22, 23, 24 and one of the second suspension arm 25 are coupled to a portion of the carrier 16 which is located below the motor rotation axis M, i.e., the portion of the carrier 16 which is located below a line M2 orthogonal to the motor rotation axis M and extending in the front and rear direction of the vehicle (which will be hereinafter referred to as "motor front-and-rear-directional line"). The other end portion of each of the first suspension arms 22, 23, 24 and the other of the second suspension arm 25 are coupled to a vehicle-body-side component, not illustrated. In the following description, the words "one end portion" may be omitted for the one end portion of each of the first suspension arms 22, 23, 24 and the one of the second suspension arm 25.

In the present embodiment, the first suspension arms 22, 23, 24 are coupled to a portion of the carrier 16 which is located on a rear side of the motor rotation axis M in the vehicle, i.e., the portion of the carrier 16 which is located on a rear side of a line M1 orthogonal to the motor rotation axis M and extending in the up and down direction (which will be hereinafter referred to as "motor up-and-down-directional line"). It is noted that the first suspension arms 22, 23, 24 may be hereinafter referred to as "lower arm 22", "first upper arm 23", and "second upper arm 24", respectively. The lower arm 22 is coupled to a lower end portion of the carrier 16. The first upper arm 23 is coupled to a portion of the carrier 16 which is located above and on a front side of a coupling portion 22R of the lower arm 22 in the vehicle. The second upper arm 24 is coupled to a portion of the carrier 16 which is located above and on a rear side of the coupling portion 22R of the lower arm 22 in the vehicle. A coupling portion 24R of the second upper arm 24 is located on a rear side of a coupling portion 23R of the first upper arm 23 in the vehicle. The coupling portion 23R of the first upper arm 23 is located on the innermost side in the vehicle, and the coupling portion 24R of the second upper arm 24 is located on the outermost side in the vehicle among the coupling portion 23R of the first upper arm 23, the coupling portion 22R of the lower arm 22, the coupling portion 24R of the second upper arm 24. These configurations will be described below in detail.

In the present embodiment, the lower arm 22 is coupled to a portion of the carrier 16 which is located below the speed reducer 14 and substantially just under the speed-reducer rotation axis O, i.e., the portion of the carrier 16 which is located on or near the speed-reducer up-and-down-directional line B1. A transversal leaf spring 36 is mounted on the lower arm 22.

It is noted that a shock absorber 38 is mounted on the lower arm 22 or a portion of the carrier 16 which is located near the coupling portion 22R of the lower arm 22.

The first upper arm 23 is coupled to a portion 16a of the carrier 16 which is located on an inner side of an inner-side end surface F of the in-wheel motor 12 in the vehicle. Specifically, a portion of the carrier 16 which is located between the motor up-and-down-directional line M1 and the speed-reducer up-and-down-directional line B1 protrudes upward and inward in the vehicle, and the first upper arm 23 is coupled to the protruding portion 16a. The coupling portion 23R of the first upper arm 23 is located outside the wheel 8. In other words, the coupling portion 23R is located at the portion of the carrier 16 which is located on an inner side of a plane A in the vehicle, and the plane A connects an inner end portion of a rim 8R of the wheel 8 (the inner end plane A of the rim 8R).

It is not essential that the first upper arm 23 is coupled to the portion of the carrier 16 which is located on a rear side of the motor up-and-down-directional line M1 in the vehicle, and the first upper arm 23 may be coupled to a portion of the carrier 16 which is located on a front side of the motor up-and-down-directional line M1 in the vehicle.

The second upper arm 24 is coupled to a rear end portion of the carrier 16 at a position located substantially on the speed-reducer front-and-rear-directional line B2. The second upper arm 24 is usually extended in accordance with the performance of the suspension, for example. Thus, the second upper arm 24 is preferably coupled to an upper portion of the carrier 16 at an outer position in the vehicle as much as possible. For this reason, in the present embodiment, a portion of the carrier 16 which is located on a rear side of the in-wheel motor 12 in the vehicle (on an upper side of a line M3 extending through a lower end portion of the in-wheel motor 12 in the front and rear direction of the vehicle), which is located below a lower end portion 18d of the caliper 18, and which is located on an outer side of the inner-side end surface F of the in-wheel motor 12 in the vehicle protrudes toward a rear side of the vehicle, and the second upper arm 24 is coupled to the protruding portion 16b.

It is noted that the second upper arm 24 may be coupled to a portion of the carrier 16 at which an absolute value of a central angle about the rotation center of the speed reducer 14 with respect to the line B2 orthogonal to the speed-reducer rotation axis O and extending in the front and rear direction of the vehicle falls within a set angle.

A trailing arm 25 as the second suspension arm is a substantially A-shaped arm including a top portion 26 and a wide portion having end portions 30, 31. The trailing arm 25 is coupled at the top portion 26 to the vehicle-body-side component, not illustrated, and coupled at the end portions 30, 31 to a front end portion of the carrier 16. In other words, the trailing arm 25 is coupled at a portion of the carrier 16 which is located on a front side of the motor up-and-down-directional line M1 in the vehicle.

In the present suspension apparatus 10, as described above, the first suspension arms 22-24 are coupled to the portion of the carrier 16 which is located below the motor rotation axis M, and the transversal leaf spring 36 is mounted on the lower arm 22. This configuration can lower the bottom of a body of the vehicle. Also, the design flexibility of the suspension arms is improved by providing the transversal leaf spring 36 instead of a coil spring and providing the in-wheel motor 12 in the wheel 8 as a drive motor, for example. This configuration can optimize a coupling position, the length, and so on of each of the suspension arms, making it possible to improve the functions of the suspension apparatus.

Furthermore, the first upper arm 23 is less than the second upper arm 24 and coupled to the portion of the carrier 16 which is located on an inner side of the inner-side end surface F of the in-wheel motor 12 in the vehicle, so as to satisfy required toe characteristics and so on and well secure a space for the in-wheel motor 12 in the wheel 8, in other words, in a region surrounded by the rim 8R.

Furthermore, the second upper arm 24 is coupled to the portion of the carrier 16 which is located below the lower end portion 18d of the caliper 18 and on an outer side of the coupling portion 23R of the first upper arm 23 in the vehicle. This configuration results in a greater length of the second upper arm 24 and good suspension performance.

It is noted that the wheel 8 is not limited to the rear wheel and may be a front wheel. The in-wheel motor 12 and the speed reducer 14 may be provided coaxially. While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, the speed reducer 14 is not essential.

Claimable Inventions

There will be described claimable inventions.

(1) A suspension apparatus configured to support a wheel of a vehicle, the wheel comprising an in-wheel motor held by a carrier, wherein a motor rotation axis that is a rotation axis of an output shaft of the in-wheel motor is located at a position identical in an up and down direction to or above a wheel rotation axis that is a rotation axis of the wheel in a state in which the in-wheel motor is held by the carrier, wherein the suspension apparatus comprises a plurality of suspension arms coupled to the carrier holding the in-wheel motor, wherein the plurality of suspension arms comprise a plurality of first suspension arms each extending substantially in a widthwise direction of the vehicle, and wherein each of the plurality of first suspension arms is coupled to a corresponding one of portions of the carrier which are located below the motor rotation axis.

For example, there are two cases as the case where the motor rotation axis is located at the position identical in the up and down direction to the wheel rotation axis: a case where the motor rotation axis and the wheel rotation axis are located at the same position (a case where the motor rotation axis and the wheel rotation axis are provided coaxially); and a case where the motor rotation axis and the wheel rotation axis are spaced apart from each other. That is, the motor rotation axis and the speed-reducer rotation axis may be provided coaxially, and in this case the motor rotation axis, the speed-reducer rotation axis, and the wheel rotation axis are located on the same axis.

(2) The suspension apparatus according to the above form (1), wherein a first upper arm of the plurality of first suspension arms is coupled to a portion of the carrier which is located on an inner side of the in-wheel motor in the vehicle.

(3) The suspension apparatus according to the above form (1) or (2), wherein the motor rotation axis is located on a front side of the wheel rotation axis in the vehicle, wherein the wheel comprises a brake comprising a caliper and configured to reduce rotation of the wheel, wherein a predetermined point in the caliper is located on a rear side of the wheel rotation axis in the vehicle and at a position identical in the up and down direction to or above the wheel rotation axis, and wherein a second upper arm of the plurality of first suspension arms is coupled to a portion of the carrier which is located on a rear side of the in-wheel motor in the vehicle and located below a lower end portion of the caliper.

The second upper arm is coupled to the portion of the carrier which is located below the lower end portion of the caliper and above a lower end portion of a motor casing for the in-wheel motor. The predetermined point in the caliper, for example, may be any of the center of gravity of the caliper and the center point of the caliper in the circumferential direction, for example.

(4) The suspension apparatus according to the above form (3), wherein the second upper arm is coupled to a portion of the carrier which is located on an outer side of a coupling portion of the first upper arm in the vehicle.

(5) The suspension apparatus according to the above form (3) or (4), wherein the second upper arm is coupled to the portion of the carrier which is located on an outer side of an inner-side end surface in the vehicle, and the inner-side end surface is an inner end surface of a motor casing for the in-wheel motor in the vehicle.

The second upper arm may be coupled to a portion of the speed reducer which is located on an outer side of an inner-side end surface of the vehicle in the vehicle.

(6) The suspension apparatus according to any one of the above forms (3) through (5), wherein the second upper arm is coupled to a portion of the carrier which is located on a rear side of the wheel rotation axis in the vehicle and at which an absolute value of a central angle about a rotation center of the wheel with respect to a line orthogonal to the wheel rotation axis and extending in a front and rear direction of the vehicle is less than or equal to a set angle.

The set angle may be any of angles greater than or equal to five degrees and less than or equal to fifteen degrees, for example. The second upper arm may be coupled to a rear end portion of the carrier.

(7) The suspension apparatus according to any one of the above forms (1) through (6), wherein a lower arm of the plurality of first suspension arms is coupled to a portion of the carrier which is located on a rear side of the motor rotation axis in the vehicle.

(8) The suspension apparatus according to the above form (7), wherein the suspension apparatus comprises a transversal leaf spring held by the lower arm.

(9) The suspension apparatus according to the above form (7) or (8), wherein the suspension apparatus comprises a shock absorber held by one of the lower arm and the carrier.

(10) The suspension apparatus according to any one of the above forms (1) through (9), wherein the plurality of suspension arms comprise a second suspension arm extending substantially in a front and rear direction of the vehicle, and wherein the second suspension arm is coupled to a portion of the carrier which is located on a front side of the motor rotation axis in the vehicle.

The second suspension arm may be coupled to a front end portion of the carrier.

(11) The suspension apparatus according to any one of the above forms (1) through (10), wherein each of the plurality of first suspension arms is coupled to a corresponding one of portions of the carrier which are located on a rear side of the motor rotation axis in the vehicle.

(12) A suspension apparatus configured to support a wheel of a vehicle, the wheel comprising an in-wheel motor held by a carrier, wherein a motor rotation axis that is a rotation axis of an output shaft of the in-wheel motor is located at a position identical in an up and down direction to or above a wheel rotation axis that is a rotation axis of the wheel in a state in which the in-wheel motor is held by the carrier, wherein the suspension apparatus comprises a plurality of suspension arms coupled to the carrier holding the in-wheel motor, wherein the plurality of suspension arms comprise a plurality of first suspension arms each extending substantially in a widthwise direction of the vehicle, and wherein a first upper arm of the plurality of first suspension arms is coupled to a portion of the carrier which is located on an inner side of the in-wheel motor in the vehicle.

The suspension apparatus according to this form may incorporate the technical feature according to any one of the above forms (1) through (11).

(13) A suspension apparatus configured to support a wheel of a vehicle, the wheel comprising: an in-wheel motor held by a carrier; and a caliper, wherein, in a state in which the in-wheel motor is held by the carrier, a motor rotation axis that is a rotation axis of an output shaft of the in-wheel motor is located on a front side of a wheel rotation axis that is a rotation axis of the wheel in the vehicle, and the motor rotation axis is located at a position identical in an up and down direction to or above the wheel rotation axis, wherein a predetermined point in the caliper is located on a rear side of the wheel rotation axis in the vehicle and at a position identical in the up and down direction to or above the wheel rotation axis, wherein the suspension apparatus comprises a plurality of suspension arms each coupled to a corresponding one of portions of the carrier which are located below the motor rotation axis, wherein a lower arm of the plurality of first suspension arms is coupled to a portion of the carrier which is located on a rear side of the motor rotation axis in the vehicle, wherein a first upper arm of the plurality of suspension arms is coupled to a portion of the carrier which is located on an inner side of a motor casing configured to cover the in-wheel motor in the vehicle and which is located above the portion of the carrier to which the lower arm is coupled, wherein a second upper arm of the plurality of suspension arms is coupled to a portion of the carrier which is located below a lower end portion of the caliper and which is located on an outer side of a coupling portion of the first upper arm in the vehicle, and wherein an arm of the plurality of suspension arms which extends in a front and rear direction of the vehicle is coupled to a portion of the carrier which is located on a front side of the wheel rotation axis in the vehicle.

The suspension apparatus according to this form may incorporate the technical feature according to any one of the above forms (1) through (11).

(14) A vehicle, comprising:
a wheel comprising an in-wheel motor; and
the suspension apparatus according to any one of the above forms (1) through (13).

(15) A vehicle, comprising:
a wheel comprising an in-wheel motor; and
a suspension apparatus configured to support the wheel,
wherein the in-wheel motor is provided such that a motor rotation axis that is a rotation axis of an output shaft of the in-wheel motor is located at a position identical in an up and down direction to or above a wheel rotation axis that is a rotation axis of the wheel, wherein the suspension apparatus comprises a plurality of suspension arms coupled to the carrier holding the in-wheel motor, wherein the plurality of suspension arms comprise a plurality of first suspension arms each extending substantially in a widthwise direction of the vehicle, and wherein each of the plurality of first suspension arms is coupled to a corresponding one of portions of the carrier which are located below the motor rotation axis.

The vehicle according to the present form may incorporate the technical feature according to any one of the above forms (1) through (14).

(16) The vehicle according to the above form (15),
wherein the wheel comprises a speed reducer configured to reduce rotation of the output shaft of the in-wheel motor and output the reduced rotation to the wheel, and wherein the carrier is configured to hold the in-wheel motor by holding the speed reducer without engagement with a motor casing configured to cover the in-wheel motor.

What is claimed is:
1. A suspension apparatus configured to support a wheel of a vehicle, the wheel comprising an in-wheel motor held by a carrier,
wherein a motor rotation axis that is a rotation axis of an output shaft of the in-wheel motor is located at a position identical in an up and down direction to or above a wheel rotation axis that is a rotation axis of the wheel in a state in which the in-wheel motor is held by the carrier, wherein the suspension apparatus comprises a plurality of suspension arms coupled to the carrier holding the in-wheel motor, wherein the plurality of suspension arms comprise a plurality of first suspension arms each extending substantially in a widthwise direction of the vehicle, wherein each of the plurality of first suspension arms is coupled to a corresponding one of portions of the carrier which are located below the motor rotation axis, and wherein a first upper arm of the plurality of first suspension arms is coupled to a portion of the carrier which is located on an inner side of the in-wheel motor in the vehicle, wherein the motor rotation axis is located on a front side of the wheel rotation axis in the vehicle, wherein the wheel comprises a brake comprising a caliper and configured to reduce rotation of the wheel, wherein a predetermined point in the caliper is located on a rear side of the wheel rotation axis in the vehicle and at a position identical in the up and down direction to or above the wheel rotation axis, and wherein a second upper arm of the plurality of first suspension arms is coupled to a portion of the carrier which is located on a rear side of the in-wheel motor in the vehicle and located below a lower end portion of the caliper.

2. The suspension apparatus according to claim 1, wherein the second upper arm is coupled to the portion of the carrier which is located on an outer side of an inner-side end surface in the vehicle, and the inner-side end surface is an inner end surface of a motor casing for the in-wheel motor in the vehicle.

3. The suspension apparatus according to claim 1,
wherein the plurality of suspension arms comprise a second suspension arm extending substantially in a front and rear direction of the vehicle, and wherein the second suspension arm is coupled to a portion of the carrier which is located on a front side of the motor rotation axis in the vehicle.

4. A suspension apparatus configured to support a wheel of a vehicle, the wheel comprising an in-wheel motor held by a carrier,
wherein a motor rotation axis that is a rotation axis of an output shaft of the in-wheel motor is located at a position identical in an up and down direction to or above a wheel rotation axis that is a rotation axis of the wheel in a state in which the in-wheel motor is held by the carrier, wherein the suspension apparatus comprises a plurality of suspension arms coupled to the carrier holding the in-wheel motor, wherein the plurality of suspension arms comprise a plurality of first suspension arms each extending substantially in a widthwise direction of the vehicle, wherein each of the plurality of first suspension arms is coupled to a corresponding one of portions of the carrier which are located below the motor rotation axis, wherein a first upper arm of the plurality of first suspension arms is coupled to a portion of the carrier which is located on an inner side of the in-wheel motor in the vehicle, wherein a lower arm of the plurality of first suspension arms is coupled to a portion of the carrier which is located on a rear side of the motor rotation axis in the vehicle, and wherein the suspension apparatus comprises a transversal leaf spring held by the lower arm.

5. The suspension apparatus according to claim 4, wherein the suspension apparatus comprises a shock absorber coupled to one of the lower arm and the carrier.

6. A suspension apparatus configured to support a wheel of a vehicle, the wheel comprising: an in-wheel motor held by a carrier; and a caliper of a brake,
- wherein, in a state in which the in-wheel motor is held by the carrier, a motor rotation axis that is a rotation axis of an output shaft of the in-wheel motor is located on a front side of a wheel rotation axis that is a rotation axis of the wheel in the vehicle, and the motor rotation axis is located at a position identical in an up and down direction to or above the wheel rotation axis,
- wherein a predetermined point in the caliper is located on a rear side of the wheel rotation axis in the vehicle and at a position identical in the up and down direction to or above the wheel rotation axis,
- wherein the suspension apparatus comprises a plurality of suspension arms each coupled to a corresponding one of portions of the carrier which are located below the motor rotation axis,
- wherein a lower arm of the plurality of first suspension arms is coupled to a portion of the carrier which is located on a rear side of the motor rotation axis in the vehicle,
- wherein a first upper arm of the plurality of suspension arms is coupled to a portion of the carrier which is located on an inner side of a motor casing configured to cover the in-wheel motor in the vehicle and which is located above the portion of the carrier to which the lower arm is coupled,
- wherein a second upper arm of the plurality of suspension arms is coupled to a portion of the carrier which is located below a lower end portion of the caliper and which is located on an outer side of a coupling portion of the first upper arm in the vehicle, and
- wherein a member of the plurality of suspension arms which extends in a front and rear direction of the vehicle is coupled to a portion of the carrier which is located on a front side of the wheel rotation axis in the vehicle.

7. A vehicle, comprising:
a wheel comprising an in-wheel motor held by a carrier; and
a suspension apparatus configured to support the wheel,
- wherein a motor rotation axis that is a rotation axis of an output shaft of the in-wheel motor is located at a position identical in an up and down direction to or above a wheel rotation axis that is a rotation axis of the wheel in a state in which the in-wheel motor is held by the carrier,
- wherein the suspension apparatus comprises a plurality of suspension arms coupled to the carrier holding the in-wheel motor,
- wherein the plurality of suspension arms comprise a plurality of first suspension arms each extending substantially in a widthwise direction of the vehicle,
- wherein each of the plurality of first suspension arms is coupled to a corresponding one of portions of the carrier which are located below the motor rotation axis,
- wherein a first upper arm of the plurality of first suspension arms is coupled to a portion of the carrier which is located on an inner side of the in-wheel motor in the vehicle,
- wherein the wheel comprises a speed reducer configured to reduce rotation of the output shaft of the in-wheel motor and output the reduced rotation to the wheel, and
- wherein the carrier is configured to hold the in-wheel motor by holding the speed reducer without engagement with a motor casing configured to cover the in-wheel motor.

\* \* \* \* \*